United States Patent [19]

Blaszkowski

[11] 4,279,854
[45] Jul. 21, 1981

[54] METHOD AND APPARATUS FOR FORMING SOAP BARS WITH AN EMBEDDED INSERT

[76] Inventor: Henry Blaszkowski, P.O. Box 114, Southfield, Mich. 48075

[21] Appl. No.: 60,725

[22] Filed: Jul. 25, 1979

[51] Int. Cl.³ .......................... B29C 6/02; B29D 3/00
[52] U.S. Cl. ..................................... 264/275; 249/83; 264/161; 264/163; 264/274; 264/276; 425/116
[58] Field of Search .............. 264/161, 163, 263, 267, 264/268, 274, 275, 276, 46.9, 73, 77, 160, 326, 249, 425; 425/116, 125, 121, 124, 127; 249/83; 252/174

[56] References Cited

U.S. PATENT DOCUMENTS

| | | | |
|---|---|---|---|
| 461,973 | 10/1891 | Brown | 264/163 |
| 568,940 | 10/1896 | Estabrook | 425/125 |
| 1,231,530 | 6/1917 | Roberts | 264/274 |
| 1,355,254 | 10/1920 | Parsons | 264/274 |
| 1,522,566 | 1/1925 | Wiese | 425/124 |
| 1,827,549 | 10/1931 | Villain | 264/275 |
| 2,285,963 | 6/1942 | Gats et al. | 264/275 |
| 2,458,327 | 1/1949 | Wood | 264/275 |
| 2,593,668 | 4/1952 | Gora | 264/275 |
| 2,979,775 | 4/1961 | White | 264/275 |
| 3,535,414 | 10/1970 | Moses et al. | 264/163 |

*Primary Examiner*—James B. Lowe
*Attorney, Agent, or Firm*—Barnes, Kisselle, Raisch & Choate

[57] ABSTRACT

A die for a soap bar is formed of two vertically separable half sections each having a cavity therein corresponding to one-half section of the soap bar. At least one of the cavities has a central vertical pedestal therein for supporting an insert in spaced relation to the surrounding cavity walls so that when the two die sections are advanced toward each other with a soap bar blank therebetween a bar of soap is molded with the insert embedded therein in a plane between and spaced from the opposite faces of the bar.

2 Claims, 7 Drawing Figures

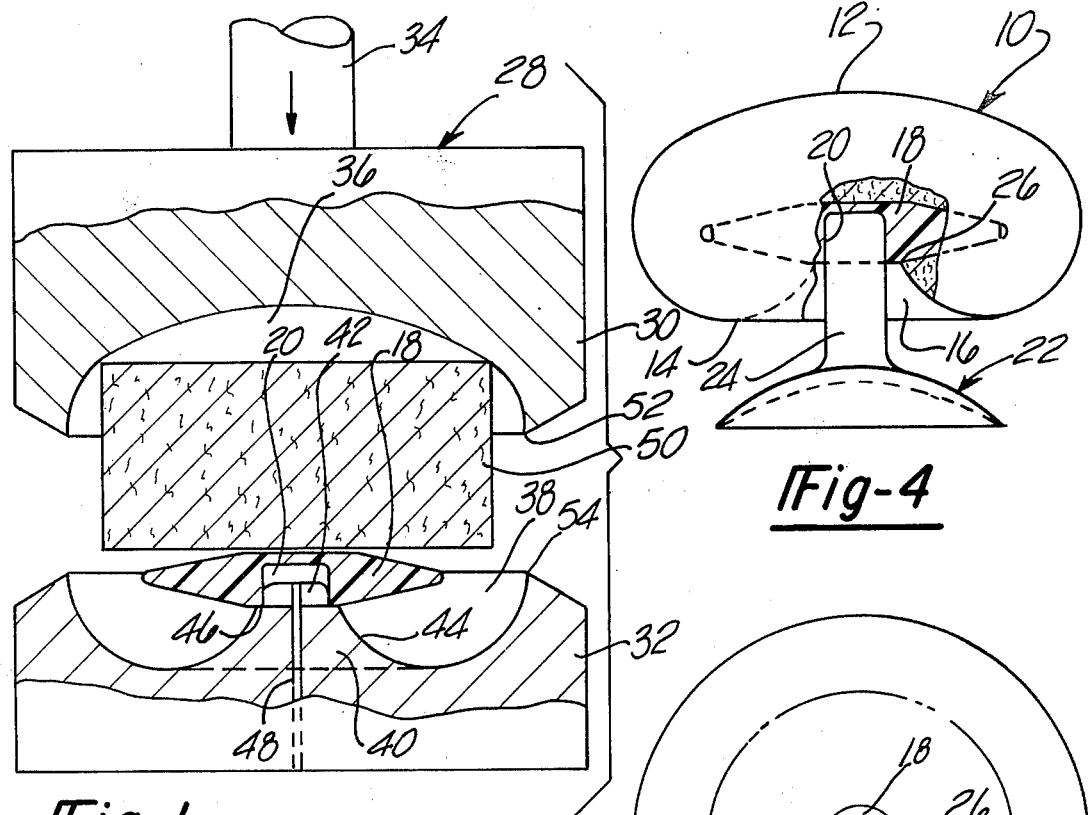
Fig-1
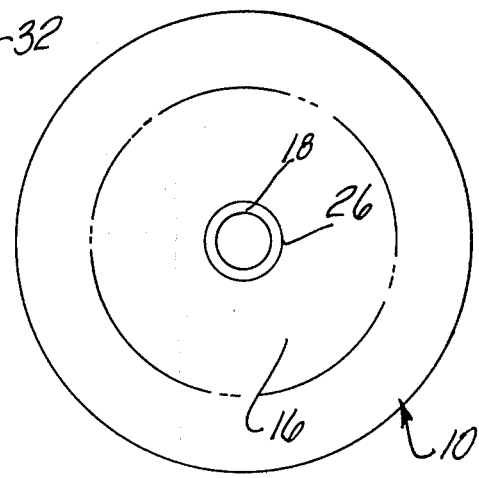
Fig-4
Fig-3
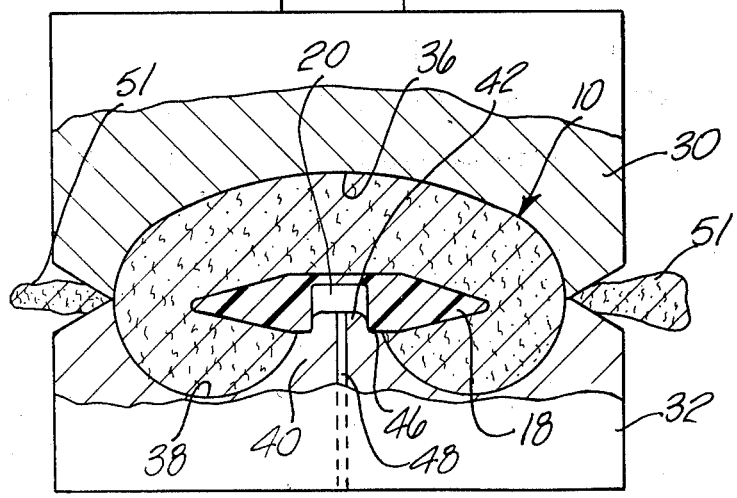
Fig-2

METHOD AND APPARATUS FOR FORMING SOAP BARS WITH AN EMBEDDED INSERT

This invention relates to a method and apparatus for manufacturing soap bars.

Some soap bars are provided with an apertured plastic insert embedded therein. The purpose of such insert is to enable the soap bar to be suspended or otherwise supported on a suitable holder in a manner such that the entire outer surface is exposed to the surrounding air. When the insert is located at one face of the soap bar the bar can simply be molded in a conventional soap bar die. However, when the insert is located in a plane intermediate and spaced from the opposite faces of the bar so that it is nearly completely surrounded by soap, the bar is normally formed as two separate half sections which are subsequently pressed together with the insert positioned therebetween.

The present invention has for its object the provision of a method and apparatus for forming in a single operation a soap bar having an insert embedded therein in a plane intermediate and spaced from the opposite faces of the bar.

More specifically, the present invention contemplates a soap bar die having two vertically separable sections each having a cavity therein which corresponds generally to half section of the finished soap bar. At least one of the cavities has a vertical pedestal therein at the center thereof which projects toward the open face of the cavity. The free end of the pedestal is designed to engage and support an apertured disc in spaced relation to the surrounding wall of the cavity. When soap bar blank is located on the insert and the two die sections are closed, the soap flows completely around the insert to form the finished soap bar with the insert embedded therein. The pedestal forms a socket in one face of the soap bar extending to the embedded insert for enabling interengagement of the insert with a suitable holder. In the event it is desired to have a socket in each of the opposed faces of the soap bar, then both of the die cavities are formed with axially opposed pedestals therein which when the die is closed engage in end-abutting relation at the level of insert.

Other objects, features and advantages of the present invention will become apparent from the following description and accompanying drawings, in which:

FIG. 1 is a vertical sectional view of a soap bar die according to the present invention with the two half sections of the die in vertically separated condition and showing a soap bar blank positioned therebetween and supported on an insert mounted within one of the half sections of the die.

FIG. 2 shows the die of FIG. 1 is closed position and forming the finished soap bar.

FIG. 3 is a bottom plan view of the soap bar.

FIG. 4 is a side elevational view, partly in section and showing the soap bar supported on a holder.

Figure 5:
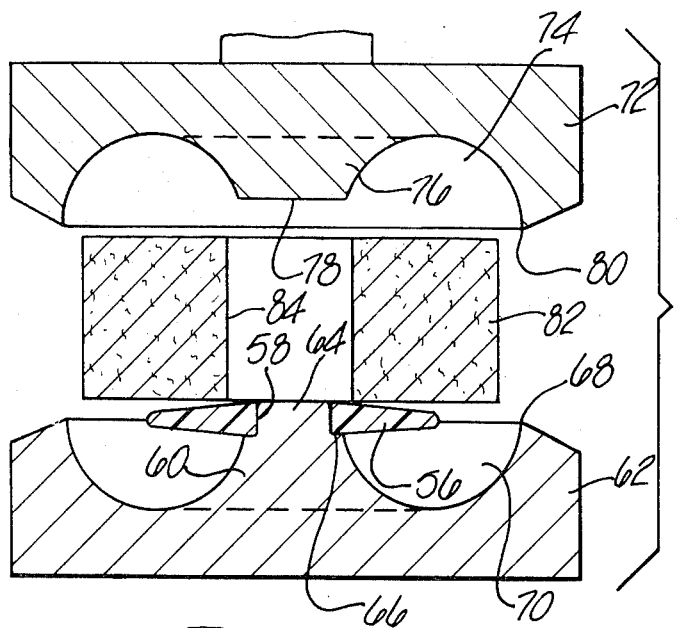
FIG. 5 is a vertical sectional view through a soap bar die of modified construction.

Referring first to FIG. 4, there is illustrated a soap bar 10 of the type to which the method and apparatus of this invention relates. Soap bar 10 is generally circular in horizontal section and is provided with an upper face 12 and a lower face 14. The lower face 14 is fashioned with a central inwardly tapered socket 16 which extends inwardly to an insert 18 embedded in the soap bar in a plane intermediate and spaced from the opposite faces 12,14 of the bar. Insert 18 is preferably in the form of a circular disc having a cylindrical cavity 20 therein which communicates with the tapered socket 16 of the soap bar. A holder 22 for the soap bar has a shank 24, the head of which is adapted to telescope into cavity 20 to support the soap bar. Preferably, as shown in FIG. 4, the inwardly tapered wall of socket 16 intersects the bottom face of insert 20 around a circular line 26 which is concentric to and spaced slightly radially outwardly from the opening defined by the cavity 20 in an insert 18.

The die for forming soap bar 10 in a single operation and its method of operation are illustrated in FIGS. 1 and 2. The die generally designated 28 comprises an upper section 30 and a lower section 32. The die sections 30,32 are adapted to be moved relatively toward and away from each other. In the arrangement illustrated the upper die section 30 is vertically movable by means of a vertically powered ram 34.

The upper die section 30 is formed with a cavity 36 which conforms generally in size and shape with the upper half section of the soap bar 10. The lower die section 32 is likewise formed with a cavity 38 having a vertically extending pedestal 40 at the center thereof. Pedestal 40 is circular in horizontal section and has a circular head 42 of reduced cross section at the upper end thereof the diameter of which corresponds closely with the diameter of cavity 20 in insert 18. Head 42 is connected with the adjacent peripheral wall 44 of pedestal 40 by a radially outwardly extending flat shoulder 46. The peripheral wall 44 of pedestal 40 conforms in size and shape to the peripheral wall of socket 16 in soap bar 10. The lower die section 32 is preferably provided with a central air vent passageway 48 extending upwardly through pedestal 40 and head 42.

To form the soap bar 10 with the die shown in FIG. 1 the insert 18 is telescoped over the head 42 at the upper end of pedestal 40. The lower face of the insert is firmly seated on the shoulder 46 and since the head 52 has a rather close fit with the cavity 20 the insert is thus supported on pedestal 40 in a very stable position. With the die sections 30,32 in the separated condition a warm and readily deformable soap bar blank 50 of appropriate size is positioned on the top face of insert 18. Thereafter, the die is closed by causing the upper section 30 to descend so that the parting edges 50,52 of the two die sections inner engage as shown in FIG. 2.

As the upper die section 30 descends it engages the soap bar blank 50 and displaces the soap vertically and laterally so as to completely fill the two cavities when the die is completely closed. The excess soap of blank 50 extrudes outwardly as at 51 between the parting edges 50,52 as they approach one another. When the two die sections are completely closed, the soap bar is molded to its finished shape and the insert 18 is completely enveloped in soap except for the portion thereof engaged by the shoulder 46 at the upper end portion of pedestal 40.

Figure 7:
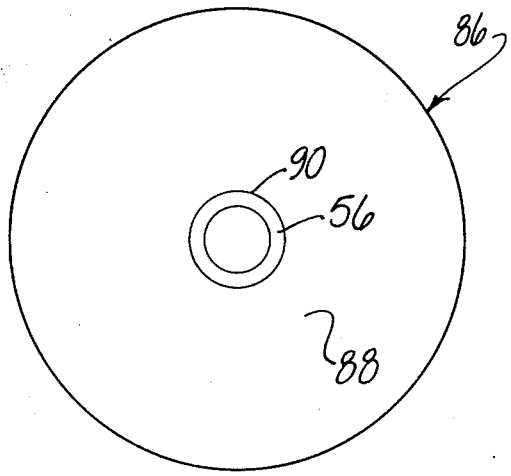
FIG. 7 is a bottom plan view of the finished soap bar.
Figure 6:
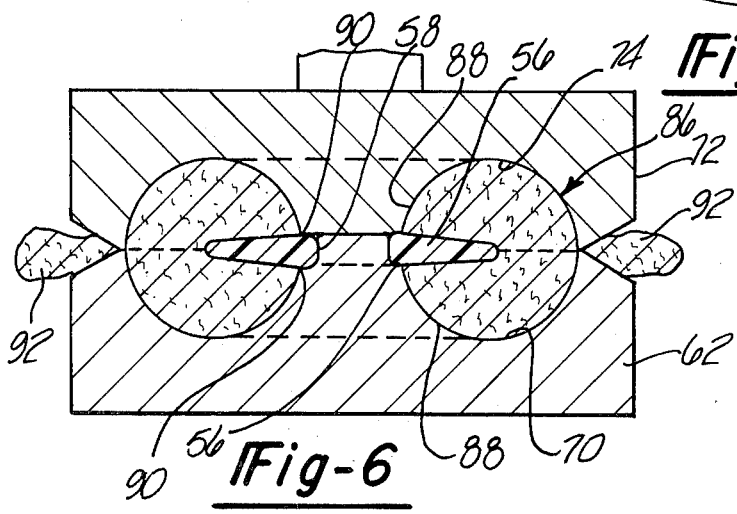
FIG. 6 is a sectional view of the die shown in FIG. 5 in closed condition.

In the arrangement shown in FIGS. 5 through 7 the insert 56 is likewise in the shape of a thin circular disc but, unlike insert 18, is formed with a central aperture 58 extending entirely through the insert. The pedestal 60 on the lower die section 62 has a reduced cylindrical head 64 at its upper end the height of which corresponds with the thickness of insert 56. The shoulder 66 is located such that the central medial plane of insert 56 is generally coplanar with the parting edge 68 of the lower die cavity 70. The upper die section 72 also has a cavity 74 extending around a central pedestal 76. The flat end face 78 of pedestal 76 is located in a plane above the parting edge 80 of upper die section 72 and has a diameter such as to overlie both the end of head 64 and the surrounding peripheral portion of disc 56 when the die is closed.

The arrangement shown in FIG. 5 and 6 operates in substantially the same manner as the die illustrated in FIGS. 1 and 2. However, in the case of the die shown in FIGS. 5 or 6 the cylinder soap bar blank 82 may be formed with a central bore 84 of slightly larger diameter than the end face 78 of pedestal 76. When the insert 56 is arranged on shoulder 66 as shown in FIG. 5 and the upper die section 72 is driven downwardly after the soap blank 82 is positioned on the insert the soap is caused to flow laterally inward around insert 56 so that when the parting edges 68,80 abut, the finished soap bar 86 thus formed is in the shape of a torus with the insert 56 embedded in the generally medial plane thereof. Thus the soap bar has a symmetrical tapered sockets 88 at the opposite faces thereof which intersect the insert along circular lines 90 spaced slightly radially outwardly from the central aperture 58 of the insert. The excess soap is extruded outwardly between the parting edges 68,80 as at 92.

In both arrangements illustrated it will be observed that the free end of the pedestal is designed to retain the insert in a rigid stable position spaced from the surrounding walls of the cavity so that in the finished soap bar the insert will be located in the desired oriented position substantially completely surrounded by soap. In the embodiment illustrated in FIGS. 1–4 the shoulder 46 may be omitted and the free end of the pedestal designed and dimensioned such that it telescopes fully into the cavity insert to firmly retain the insert thereon.

I claim:

1. The method of making a soap bar having a pair of opposed faces and a relatively rigid, centrally apertured insert embedded therein in a plane spaced between said opposed faces, said insert having a lateral dimension substantially greater than its central aperture and substantially less than the lateral dimension of the soap bar so that the periphery of the insert is spaced substantially inwardly from the periphery of the soap bar, said insert having opposed, laterally extending faces and being relatively thin as compared to its lateral dimension, said method comprising the steps of providing a die having a pair of vertically separable sections each having a cavity therein which is relatively shallow as compared to its lateral dimension, both cavities being open at the parting face of the die and having corresponding dimensions at said parting face, the parting face portion of at least one die section surrounding the cavity therein being inclined to the central vertical axis of the die at an acute angle and intersecting the periphery of the cavity in a relatively sharp edge so that when the two die sections completely close at the parting face, said inclined surrounding face cooperates with the cavity-surrounding face portion of the other die section to form an annular recess at the parting faces of the die which diverges in a radially outward direction, each cavity corresponding in size and shape to generally one of the opposite half sections of the soap bar, each of said cavities having a central, vertically extending pedestal fixed therein which terminates in a free end portion having a flat end face spaced vertically from the base of the respective cavity, said pedestals having a vertical dimension such that the said free end faces advance into substantial coplanar abutting relation when the die is closed, the free end portion of one of said pedestals corresponding in size with the insert aperture and having an enlarged concentric annular shoulder spaced axially from its free end face a distance substantially equal to the thickness of the insert at the annular portion thereof surrounding the aperture therein, said shoulder extending in a plane substantially perpendicular to the vertical axis of the pedestal, the end face of the other pedestal being sized and shaped to correspond generally with the outer periphery of said shoulder, separating the die sections so that the cavities are spaced apart vertically in axially opposed relation, positioning the insert over the free end of said one pedestal and seating it on said shoulder so that it extends in a generally horizontal plane with the free end portion of the pedestal received within the aperture of the insert with a relatively close fit so as to support the insert in a fixed, stable position on said one pedestal with its periphery spaced laterally inwardly from the surrounding wall of the cavity and vertically from the underlying wall portion of the cavity, placing a pressure deformable soap blank having a volume greater than the cavities between the cavity of the other die section and the face of the insert adjacent thereto, progressively closing the die sections so that the soap blank applies an axial force to the insert which maintains it firmly seated on said shoulder and during initial closing movement of the die the insert cooperates with the wall of the other cavity to cause the soap in the blank to flow laterally outwardly over the adjacent face of the insert, around the periphery of the insert and axially into the cavity of said one die section and simultaneously said end faces causing the soap therebetween to be displaced radially outwardly as they approach one another and, during continued closing movement, the cavity wall of said one die section causes the soap flowing therein to flow laterally inwardly toward said one pedestal and against the opposite face of the insert so that when the die completely closes said free end faces are in substantial coplanar engagement, the soap completely fills the die cavity and the excess soap flows radially outwardly into said annular recess whereby to form through the finished soap bar an opening which corresponds in size and shape with the portions of the pedestal on opposite sides of the insert and to leave an annular portion of the insert surrounding the aperture therein exposed at the opposite faces of the embedded insert, separating the die sections and thereafter removing the finished soap bar with the insert embedded therein from the free end portion of said one pedestal.

2. A die for molding a soap bar of the type having a pair of opposed faces and a relatively rigid insert embedded therein in a plane spaced between the opposite faces of the soap bar, said insert having a central aperture extending therethrough, the axis of the aperture extending transversely of the opposite faces of the soap bar, said die comprising a pair of vertically separable die sections, means for relatively moving the die sections toward and away from each other to open and close the die, each of said die sections having a cavity therein which is relatively shallow as compared with its lateral dimension, said cavities being open at the parting face of the die and the peripheries of said cavities being in registering relationship at said parting face, each of said cavities corresponding in size and shape generally to the opposite half sections of the soap bar, the parting face portion of at least one of said die sections surrounding the cavity therein being inclined to the central vertical axis of the die at an acute angle and intersecting the periphery of the cavity in a relatively sharp edge so that when the two die sections close at the parting face of the die said inclined surrounding face cooperates with the cavity-surrounding face portion of the other die section to form an annular recess at the parting faces of the die which diverges in a radially outward direction, each of said cavities having a central vertically extending pedestal fixed therein which terminates in a free end portion having a flat end face spaced vertically from the base of the respective cavity, said pedestals having a vertical dimension such that said flat end faces advance into substantial coplanar abutting relation when the die is closed, the free end portion of one of said pedestals having an enlarged concentric shoulder extending in a plane substantially perpendicular to the vertical axis of the pedestal and spaced from its free end face a distance substantially equal to the thickness of the annular portion of the insert surrounding the aperture therein, said last mentioned free end portion being dimensioned to have a close fit with the aperture in the insert so that the insert can be telescoped over said free end portion and supported on a stable position on said shoulder, the end face of the other pedestal being sized and shaped to correspond generally with the outer periphery of said shoulder, whereby, when a soap blank having a volume greater than the two cavities is positioned between the separated die sections so that it is located between the pedestal-supported insert and the other cavity and the die is closed, the cavity walls displace the soap laterally and vertically to substantially completely surround the insert and fill the cavity, the excess soap is squeezed laterally outwardly into said annular recess and the flat end faces abut to leave an annular portion of the insert surrounding the aperture therein exposed at the opposite faces of the embedded insert.

* * * * *